(12) United States Patent
Fukushima

(10) Patent No.: US 6,275,323 B1
(45) Date of Patent: *Aug. 14, 2001

(54) OPTICAL ATTENUATOR

(75) Inventor: Nobuhiro Fukushima, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,686

(22) Filed: Dec. 4, 1998

Related U.S. Application Data

(62) Division of application No. 08/789,178, filed on Jan. 24, 1997, now Pat. No. 5,889,609, which is a continuation of application No. 08/098,028, filed on Jul. 28, 1993, now abandoned.

(30) Foreign Application Priority Data

Jul. 31, 1992 (JP) .................................... 4-205044

(51) Int. Cl.$^7$ ....................................... G02F 1/09
(52) U.S. Cl. ................... 359/280; 359/281; 359/284; 359/289; 359/282
(58) Field of Search ................... 359/280, 281, 359/284, 289, 282; 324/96, 117 R; 372/94, 6, 18, 27, 34, 23; 385/11, 27

(56) References Cited

U.S. PATENT DOCUMENTS

| | | | |
|---|---|---|---|
| 3,370,916 | 2/1968 | Shafer | 359/281 |
| 3,376,157 | 4/1968 | Guerici et al. | 117/109 |

(List continued on next page.)

FOREIGN PATENT DOCUMENTS

| | | |
|---|---|---|
| 47-5490 | 3/1972 | (JP) . |
| 56-94326 | 7/1981 | (JP) . |
| 57-68818 | 4/1982 | (JP) . |
| 57-94715 | 6/1982 | (JP) . |
| 57-168221 | 10/1982 | (JP) . |

(List continued on next page.)

OTHER PUBLICATIONS

Fukada, et al., "Gain–Bandwidth and Noise–Figureue Measuring Technique on an Optical In–Line Amplifier", Technical Report of IEICE, OSC94–69, OPE94–92 (Nov. 1994) (English translation of Abstract only is provided).

Shirasaki et al., "Magnetooptical 2x2 switch for single–mode fibers," *Applied Optics*, vol. 23, No. 19, Oct. 1984, pp. 3271–3276.

Sugaya et al., "Novel configuration for low–noise and wide–dynamic–range Er–doped fiber amplifierfor WDM systems," *OAA '95*, Paper FC3, Jun. 16, 1995 (Davos, Switzerland), 4 pages.

(List continued on next page.)

*Primary Examiner*—Mohammad Y. Sikder
(74) *Attorney, Agent, or Firm*—Staas & Halsey

(57) ABSTRACT

A specific polarized light component out of a light wave passed through a magneto-optic crystal (for example YIG) is extracted by a polarizer. The intensity of the light beam output from the polarizer depends on strength and direction of magnetic fields applied to the magneto-optic crystal. The magneto-optic crystal is applied with a first and a second magnetic field acting in directions different from each other and the strength of the composite magnetic field of them is set to exceed a predetermined value at all times. By varying at least one of the first and second magnetic fields, the attenuation factor in the magneto-optic crystal can be changed continuously and with good reproducibility.

50 Claims, 7 Drawing Sheets

U.S. PATENT DOCUMENTS

| | | | |
|---|---|---|---|
| 3,407,364 | 10/1968 | Turner | 359/247 |
| 3,411,840 | 11/1968 | Robinson | 359/282 |
| 3,527,577 | 9/1970 | Fan et al. | 423/464 |
| 3,558,214 | 1/1971 | DeLang et al. | 359/250 |
| 3,700,307 | 10/1972 | Glenn | 359/497 |
| 3,719,414 | 3/1973 | Wentz | 359/247 |
| 4,059,759 | 11/1977 | Harney et al. | 250/206 |
| 4,305,046 | 12/1981 | Le Floch et al. | 372/106 |
| 4,387,953 | 6/1983 | Shirasaki et al. | 385/11 |
| 4,548,478 | 10/1985 | Shirasaki | 359/256 |
| 4,581,579 | 4/1986 | Shirasaki | 359/256 |
| 4,609,257 | 9/1986 | Shirasaki | 359/282 |
| 4,637,027 | 1/1987 | Shirasaki et al. | 359/251 |
| 4,650,289 | 3/1987 | Kuwahara | 359/484 |
| 4,668,052 | 5/1987 | Shirasaki | 359/251 |
| 4,678,287 | 7/1987 | Buhrer | 359/498 |
| 4,818,881 | 4/1989 | Tanton et al. | 250/338.1 |
| 4,856,878 | 8/1989 | Wilson et al. | 359/281 |
| 4,933,629 | 6/1990 | Kozuka et al. | 324/96 |
| 4,947,035 | 8/1990 | Zook et al. | 250/225 |
| 4,952,014 | 8/1990 | Lieberman et al. | 324/244.1 |
| 4,973,120 | 11/1990 | Jopson et al. | 385/50 |
| 4,975,918 * | 12/1990 | Morton | 372/20 |
| 4,984,875 | 1/1991 | Abe et al. | 359/281 |
| 4,988,170 | 1/1991 | Buhrer | 359/498 |
| 5,029,953 | 7/1991 | Dexter et al. | 359/352 |
| 5,033,830 | 7/1991 | Jameson | 359/484 |
| 5,050,968 | 9/1991 | Ohara | 359/281 |
| 5,052,786 | 10/1991 | Schulz | 359/484 |
| 5,152,597 | 10/1992 | Bernard | 359/283 |
| 5,212,446 | 5/1993 | Itoh et al. | 324/244.1 |
| 5,267,078 | 11/1993 | Shiraishi et al. | 359/282 |
| 5,345,329 | 9/1994 | Shirai et al. | 359/282 |
| 5,463,461 * | 10/1995 | Horiuchi et al. | 356/349 |
| 5,521,741 | 5/1996 | Umezawa et al. | 359/246 |
| 5,528,415 | 6/1996 | Gauthier et al. | 359/282 |

FOREIGN PATENT DOCUMENTS

| | | |
|---|---|---|
| 57-188014 | 11/1982 | (JP) . |
| 58-49916 | 3/1983 | (JP) . |
| 59-121313 | 7/1984 | (JP) . |
| 59-121314 | 7/1984 | (JP) . |
| 59-197013 | 11/1984 | (JP) . |
| 59-197014 | 11/1984 | (JP) . |
| 60-131523 | 7/1985 | (JP) . |
| 60-200225 | 10/1985 | (JP) . |
| 60-203914 | 10/1985 | (JP) . |
| 60-165933 | 11/1985 | (JP) . |
| 60-165934 | 11/1985 | (JP) . |
| 60-222815 | 11/1985 | (JP) . |
| 60-222818 | 11/1985 | (JP) . |
| 61-97629 | 5/1986 | (JP) . |
| 1-204021 | 8/1989 | (JP) . |
| 2508 | 1/1990 | (JP) . |
| 2-83523 | 3/1990 | (JP) . |
| 2-113019 | 9/1990 | (JP) . |
| 3-206427 | 9/1991 | (JP) . |
| 4-182618 | 6/1992 | (JP) . |
| 4-308811 | 10/1992 | (JP) . |
| 6-51255 | 2/1994 | (JP) . |

OTHER PUBLICATIONS

N. Fukushima, H. Onaka, M. Shirasaki, Y. Suzuki, T. /Tokumasu, Non–Mechanical Variable Attenuator Module Using Faraday Effect, presented at the meeting "Optical Amplifiers and Their Application", held on Jul. 11–13, 1996, in Monterey, California, sponsored and managed by Optical Society of America.

M. Shirasaki, et al., "Compact Optical Isolator for Fibers Using Birefringent Wedges"; Applied Optics, vol. 21, No. 23, pp. 4296–4299, (Dec. 1982).

U.S. application No. 08/674,516, Nobuhiro Fukushima, filed Jul. 2, 1996.

U.S. application No. 08/135,557, Nobuhiro Fukushima, filed Oct. 14, 1993.

U.S. aaplication No. 08/704,946, Masataka Shirasaki et al., filed Aug. 29, 1996.

U.S. application No. 08/804,517, Hiroshi Onaka, filed Feb. 21, 1997.

U.S. application No. 08/803,378, Nobuhiro Fukushima, filed Feb. 20, 1997.

U.S. application No. 08/859,256, Nobuhiro Fukushima, filed May 20, 1997.

U.S. application No. 08/789,178, Nobuhiro Fukushima, filed Jan. 24, 1997.

* cited by examiner

OPTICAL ATTENUATOR

This application is a divisional 08/789,178 filed Jan. 24, 1997, now U.S. Pat. No. 5,889,609, which is a continuation of Ser. No. 08/098,028, filed Jul. 28, 1993, now abandoned.

BACKGROUND OF THE INVENTION

1. Field of the Invention

The present invention relates to an optical attenuator including a magneto-optic crystal.

When conducting experiments with or adjustments of an optical communication system, sometimes an optical attenuator is used for adjusting the intensity level of an optical input to any device which is part of the system. As an optical attenuator, one adapted to mechanically vary its attenuation factor is known. However, in the case where an optical attenuator is incorporated in a system with the attenuation factor thereof being one of the objects to be controlled, it is desired that an optical attenuator having no mechanically moving part be put to practical use to improve reliability on the system.

2. Description of the Related Art

As optical attenuators which have so far been in practical use, there is one in which the attenuation factor is changed by a mechanical motion. For example, having an attenuation film with a varying attenuation factor distributed thereon inserted in the optical path, the attenuation factor of the optical attenuator can be adjusted by shifting the attenuation film.

However, it sometimes becomes necessary in practice to use such an optical attenuator incorporated in a control system in which the attenuation factor of the very optical attenuator is an object to be controlled. An example is a case where, in an optical amplifier adapted to amplify a signal light wave by conducting the signal light wave together with an pumping light wave through an optical fiber doped with a rare earth element such as Er (erbium), the power of the signal light and/or pumping light is controlled in accordance with the monitored level to thereby obtain a required characteristic (for example S/N ratio). In such a case, use of an optical attenuator adjusting the attenuation factor mechanically should be avoided in order to secure reliability on the control system.

Accordingly, an object of the present invention is to provide an optical attenuator having no mechanically moving part.

Other objects of the present invention will become apparent from the following description.

SUMMARY OF THE INVENTION

According to the present invention, there is provided an optical attenuator varying an attenuation factor in its optical path in accordance with an input signal thereto comprising a magneto-optic crystal provided in the optical path, a polarizer provided in the optical path on the downstream side of the magneto-optic crystal allowing a light wave having a specific direction of polarization to pass therethrough, magnetic field application means for applying a first and a second magnetic field acting in different directions from each other to the magneto-optic crystal such that the strength of the composition of these magnetic fields exceeds a predetermined value, and magnetic field adjustment means for varying strength of at least one of the first and second magnetic fields in accordance with the input signal.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

A preferred embodiment of the present invention will be described below in detail with reference to the accompanying drawings.

Figure 1A:
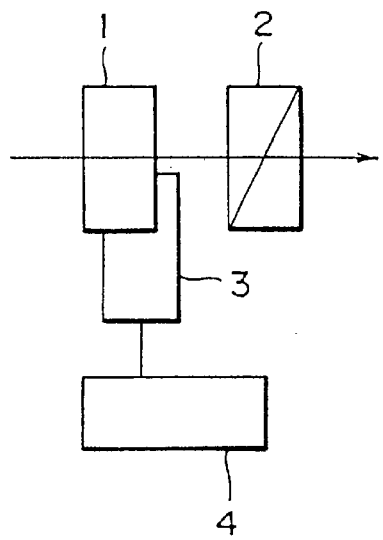
FIG. 1A is a block diagram showing a basic structure of an optical attenuator of the present invention.
Figure 1B:
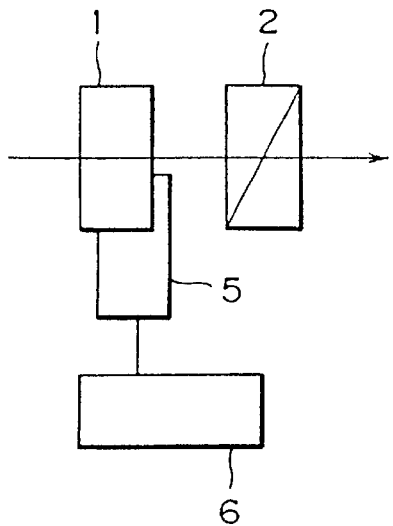
FIG. 1B is a block diagram of an optical attenuator structured with a magneto-optic crystal and a polarizer in FIG. 1A.

FIG. 1A is a block diagram showing a basic structure of an optical attenuator of the present invention. Referring to FIG. 1A, reference numerals 1 to 4 denote the above described magneto-optic crystal, polarizer, magnetic field application means, and magnetic field adjustment means, respectively. On the other hand, FIG. 1B is a block diagram showing a structure of an optical attenuator having no mechanically moving part using the magneto-optic crystal 1 and polarizer 2 shown in FIG. 1A, the idea of which can be conceived of relatively easily. Referring to FIG. 1B, reference numeral 5 denotes a means for applying a magnetic field to the magneto-optic crystal 1 in the same direction as the propagating direction of light and reference numeral 6 denotes a means for adjusting the strength of the magnetic field. Although it is unknown whether or not the optical attenuator shown in FIG. 1B has actually been proposed, the optical attenuator has been shown as an example because it is considered useful for explaining the action of the magnetic field application means 3 and magnetic field adjustment means 4.

Generally, under the condition of a magnetic field applied to a magneto-optic crystal, i.e., under the condition of a magneto-optic crystal placed in a magnetic field, if linearly polarized light is passed through the magneto-optic crystal, the direction of polarization (the projection of the plane containing the electric field vector of the linearly polarized light on the plane perpendicular to the direction of propagation) is rotated in a fixed rotating direction at all times regardless of the direction of propagation of light. This phenomena is called Faraday rotation. The magnitude of the angle of rotation of the direction of polarization (the angle of Faraday rotation) depends on the direction and strength of magnetization of the magneto-optic crystal resulting from the applied magnetic field. In concrete terms, the angle of Faraday rotation is determined by the magnitude of the component of the strength of the magnetization of the magneto-optic crystal in the direction of propagation of the light wave. In an arrangement of a magneto-optic crystal and a polarizer in combination, if the angle of Faraday rotation in the magneto-optic crystal is adjusted, the amplitude of the light wave output from the polarizer can be changed in accordance with the angle of Faraday rotation. Therefore, this arrangement is useful in realizing an optical attenuator for linearly polarized light.

According to the arrangement of FIG. 1B, it seems, at first glance, that the angle of Faraday rotation in the magneto-optic crystal 1 can be effectively adjusted by adjusting the strength of the applied magnetic field by the means 6. However, when the strength of the applied magnetic field is relatively small, the magnetization of the magneto-optic crystal 1 by the applied magnetic field does not reach its saturated state. Hence, a large number of magnetic domains within the magneto-optic crystal 1 are present. Existence of such a large number of magnetic domains degrades the reproducibility of the attenuation factor in the optical attenuator and, even if good reproducibility is secured, continuous variation in the attenuation factor becomes difficult to obtain. Further, when there exist a large number of magnetic domains within a magneto-optic crystal 1, attenuation due to scattering of light by the boundary faces of these magnetic domains is produced and this impairs the practical use of the optical attenuator.

According to the present invention, since it is arranged such that the magnetic field application means 3 applies a first and a second magnetic field to the magneto-optic crystal 1 such that the strength of the composite magnetic field exceeds a predetermined value, keeping the strength of magnetization in the magneto-optic crystal 1 saturated at all times is possible. Therefore difficulties resulting from existence of a large number of magnetic domains can be overcome. Here, the state of a magneto-optic crystal in which the strength of magnetization is saturated can be considered to be a state where all the magnetic domains are united. Further, according to the present invention, since it is arranged such that at least one of the first magnetic field and the second magnetic field is varied in strength by the magnetic field adjustment means 4, changing the direction of the composite magnetic field of the first and second magnetic fields can be achieved. When the direction of the composite magnetic field is changed, the direction of the magnetization in the magneto-optic crystal 1 is changed correspondently. As a result, although the strength of the magnetization is saturated and kept constant, the component of the strength of magnetization in the direction of propagation of light changes and, consequently, the angle of Faraday rotation in the magneto-optic crystal 1 changes. Thus, according to the present invention, an optical attenuator having no mechanically moving parts and being better in reproducibility and more excellent in practicability than the arrangement of FIG. 1B can be provided.

Figure 2:
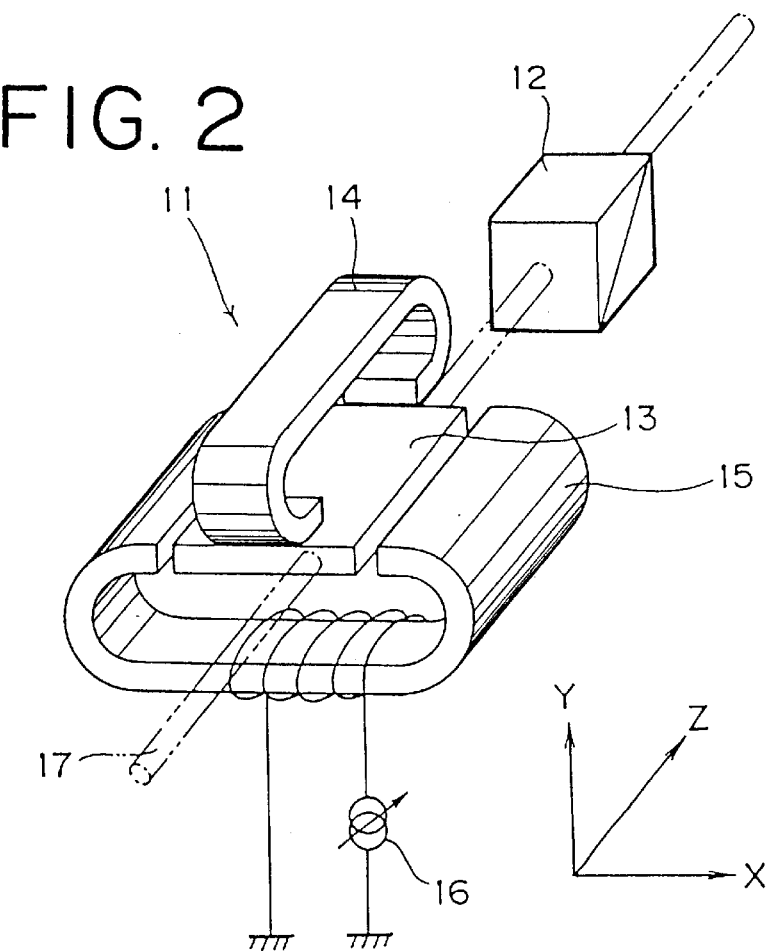
FIG. 2 is a perspective view of an optical attenuator showing a first embodiment of the present invention.

FIG. 2 is a structural drawing of an optical attenuator according to a first embodiment of the present invention. The optical attenuator includes a Faraday rotator 11 and a polarizer 12. The polarizer 12 is constituted for example of a Glan-Thompson prism. The Faraday rotator 11 is formed of a magneto-optic crystal 13, a permanent magnet 14 and an electromagnet 15 applying the magneto-optic crystal 13 with magnetic fields perpendicular to each other, and a variable current source 16 applying a drive current to the electromagnet 15. By using such a relatively thin magneto-optic crystal 13 as to allow a light beam to transmit therethrough, it becomes possible to lower the saturation magnetic field (the strength of the magnetic field required to saturate the magnetization of a magneto-optic crystal, or to saturate the angle of Faraday rotation). As the magneto-optic crystal 13, sliced YIG (yttrium-iron garnet), epitaxially grown $(GdBi)_3(FeAlGa)_5O_{12}$, or the like can be used. The direction of the magnetic field applied by the permanent magnet 14 to the magneto-optic crystal 13 is parallel to the direction of transmission of the light beam 17 through the magneto-optic crystal 13, while the direction of the magnetic field applied by the electromagnet 15 to the magneto-optic crystal 13 is perpendicular to the direction of the magnetic field applied by the permanent magnet 14 and the direction of the light beam 17 transmitted through the magneto-optic crystal 13. The light beam 17 introduced into the magneto-optic crystal 13 is linearly polarized light and the direction of polarization of the same is caused to exhibit Faraday rotation by the Faraday rotator 11. Out of two polarization components whose directions of polarization are perpendicular to each other of the light beam passed through the magneto-optic crystal 13, one polarization component is extracted by the polarizer 12 and this component becomes the optical output of the optical attenuator. The strength of the composite magnetic field of the magnetic fields from the permanent magnet 14 and the electromagnet 15 is set to be greater than the saturation magnetic field in the magneto-optic crystal 13 at all times. The reason is as described above. The variable range of the variable current source 16 is set to a range by which the direction of polarization of the emitted light beam from the magneto-optic crystal 13 can be adjusted between the direction concurrent with the direction of polarization of the optical output from the optical attenuator and the direction perpendicular to the same.

In the XYZ rectangular three-dimensional coordinate system used in the following description, the Z-axis is parallel to the direction of propagation of the transmitted light through the magneto-optic crystal 13 and the Y-axis is parallel to the direction of thickness of the magneto-optic crystal 13. Namely, in the present example, the direction of the applied magnetic field by the permanent magnet 14 is parallel to the Z-axis and the direction of the applied magnetic field by the electromagnet 15 is parallel to the X-axis.

Figure 3:
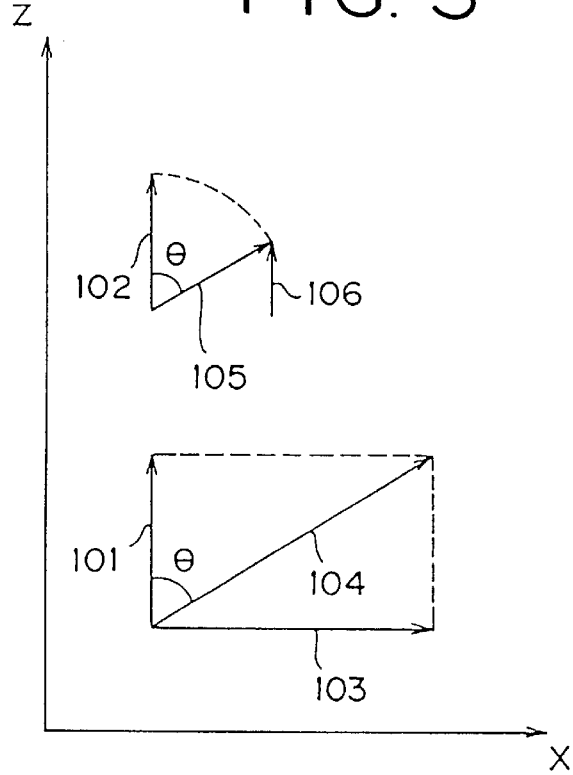
FIG. 3 is diagram explanatory of magnetic field and magnetization the magneto-optic crystal shown in FIG. 2.

FIG. 3 is a diagram explanatory of the directions and strengths of the magnetic field applied to the magneto-optic crystal 13 and the magnetization of the magneto-optical crystal 13. When a magnetic field denoted by reference numeral 101 is applied to the magneto-optic crystal 13 only by the permanent magnet 14, the magnetization of the magneto-optic crystal 13 becomes parallel to the Z-axis as indicated by reference numeral 102. In this case, the strength of the applied magnetic field (the length of the magnetic field vector 101) is set to a value by which the strength of magnetization of the magneto-optic crystal 13 (the length of the magnetization vector 102) is saturated. Now, let it be assumed that an angle of Faraday rotation bringing the transmittance of the optical attenuator to its maximum is being obtained, for example, in this state. If a magnetic field from the electromagnet 15 is applied parallel to the X-axis as indicated by reference numeral 103, the composite magnetic field becomes a composite vector of the magnetic field vectors 101 and 103 as indicated by reference numeral 104. By this composite magnetic field 104, there is produced magnetization as indicated by reference numeral 105 in the magneto-optic crystal 13. The magnetization vector 105 and the magnetic field vector 104 are parallel to each other and the length of the magnetization vector 105 is in agreement with the length of the magnetization vector 102. Even if the strengths of magnetization of the magneto-optic crystal 13 are equal, it does not necessarily mean that the degrees of contribution made by them to the angle of Faraday rotation in the magneto-optical crystal 13 are equal. This is because the angle of Faraday rotation depends also on the relationship between the direction of the magnetization and the direction of propagation of light. More specifically, when the state where the magnetization 102 is existing and the state where the magnetization 105 is existing are compared, the Z component 106 of the magnetization 105 shows a decrease against the Z component of the magnetization 102 (the magnetization 102 itself), and the angle of Faraday rotation in the state of the latter becomes smaller corresponding to that decrease. Since the maximum transmittance is obtained in the state of the former, if it is desired to obtain the minimum transmittance in the state of the latter, i.e., to have all of the components of the light beam eliminated by the polarizer 12 in the state of the latter, it will be achieved by setting the difference in the angle of Faraday rotation between both of the states to $\pi/2$ (90°). Expressing now the angle formed between the magnetic field 101 from the permanent magnet 14 and the composite magnetic field 104 by $\theta$, the angle formed between the magnetization 102 and the magnetization 105 also becomes $\theta$. Hence the ratio between the Z component 106 of the magnetization 105 and the magnetization 102 equals $\cos\theta$. If, for example, the angle of Faraday rotation of the magneto-optic crystal 13 is set to $2\pi$ when only the magnetic field from the permanent magnet 14 is applied, the entire range from the maximum transmittance to the minimum transmittance can be covered by setting the range of variation of the current of the variable current source 16 such that $(1-\cos\theta)$ becomes 0.25. When the corresponding angle of Faraday rotation is $4\pi$ and $8\pi$, the value of $(1-\cos\theta)$ may become 0.25/2 and 0.25/4, respectively.

Therefore, if it is desired to hold down the range of variation of the current to cover the entire range from the maximum transmittance to the minimum transmittance, it will be achieved, when the angle of Faraday rotation under the application of the magnetic field only from the permanent magnet 14 is expressed by $2n\pi$ (n is a natural number), by making n as great as possible. Although n was stated above to be a natural number for convenience of explanation, it may be some other value. The value of n can be set in accordance with the relationship between the direction of polarization of the input light and the direction of polarization of the transmitted light beam through the polarizer 12. Since, according to the present embodiment, saturation magnetic fields are applied to the magneto-optic crystal 13 throughout the range from where it provides the maximum transmittance to where it provides the minimum transmittance, there arises no problem due to formation of a large number of magnetic domains within the magneto-optic crystal 13. Further, since electrical adjustments are possible throughout the entire range from the point where the maximum transmittance is given to the point where the minimum transmittance is given, it becomes possible to provide an optical attenuator having good response and which is highly reliable.

Figure 4:
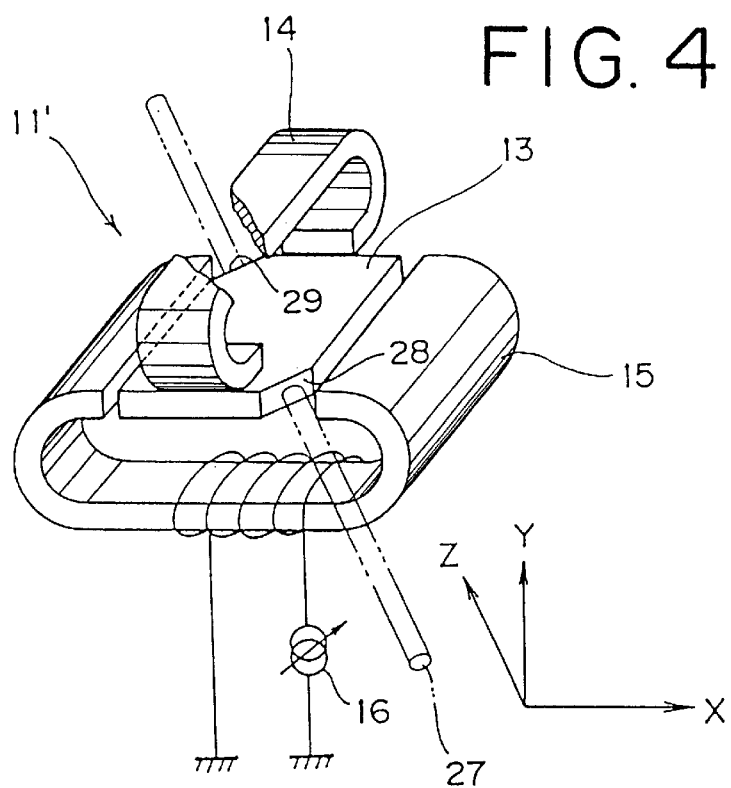
FIG. 4 is a perspective view showing another example of structure of a Faraday rotator shown in FIG. 2.

FIG. 4 is a diagram showing a variation of the Faraday rotator 11 shown in FIG. 2. Points in which this Faraday rotator 11' are different from the Faraday rotator 11 in FIG. 2 are that planes 28 and 29 parallel to each other are formed at opposing corner portions, i.e., at both end portions of a diagonal, of the magneto-optic crystal 13 and a light beam 27 is arranged to penetrate these planes 28 and 29. In this example, the direction of the magnetic field from the permanent magnet 14 and the direction of the magnetic field from the electromagnet 15 are both at an angle of approximately 45° with the a direction of propagation of the light beam. In this example, in the XYZ rectangular coordinate system, it is set so that the Y-axis is parallel to the direction of the thickness of the magneto-optic crystal 13 and the Z-axis is parallel to the direction of propagation of the light beam.

Figure 5:
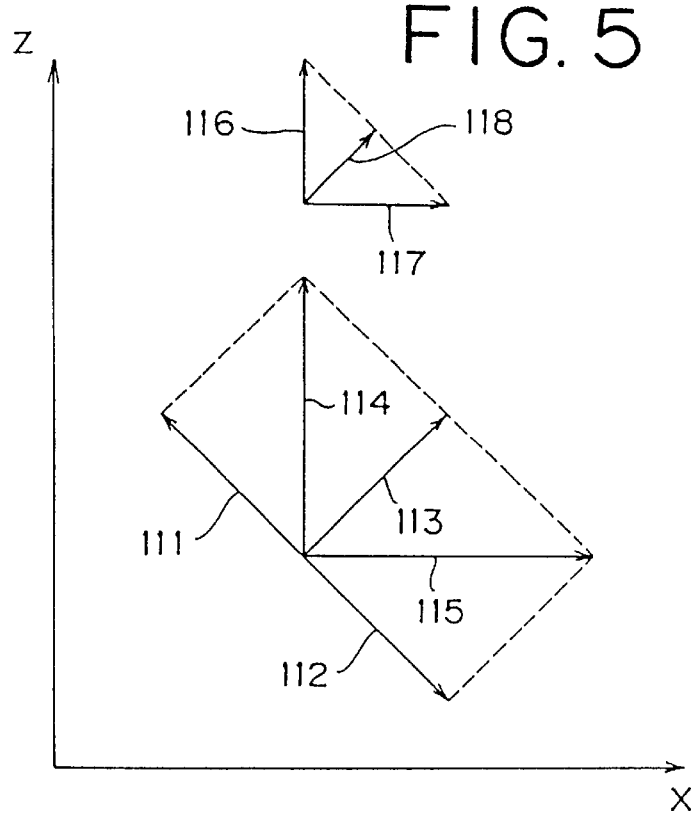
FIG. 5 is a diagram explanatory of magnetic field and magnetization is the Faraday rotator shown in FIG. 4.

FIG. 5 is a diagram explanatory of the magnetic field and magnetization in the Faraday rotator shown in FIG. 4. The magnetic field applied by the electromagnet 15 is adjustable in strength and direction between the state indicated by reference numeral 111 and the state indicated by reference numeral 112. Reference numeral 113 indicates the magnetic field applied by the permanent magnet 14. In this case, the composite magnetic field varies in strength and direction over the range from the state indicated by reference numeral 114 to the state indicated by reference numeral 115. In accordance with this, the magnetization of the magneto-optic crystal 13 varies in strength and direction over the range from the state indicated by reference numeral 116 to the state indicated by reference numeral 117. As apparent from the diagram, if the Faraday rotator 11' shown in FIG. 4 is used, the variable range of the above described angle $\theta$ can be easily set to a range from 0 to $\pi/2$. The magnetic field applied by the permanent magnet 14 is set so that the angle of Faraday rotation will be sufficiently in the state where the strength of the magnetization is at its minimum, as indicated by reference numeral 118 (the state where the magnetic field applied by the electromagnet 15 is zero).

Figure 6:
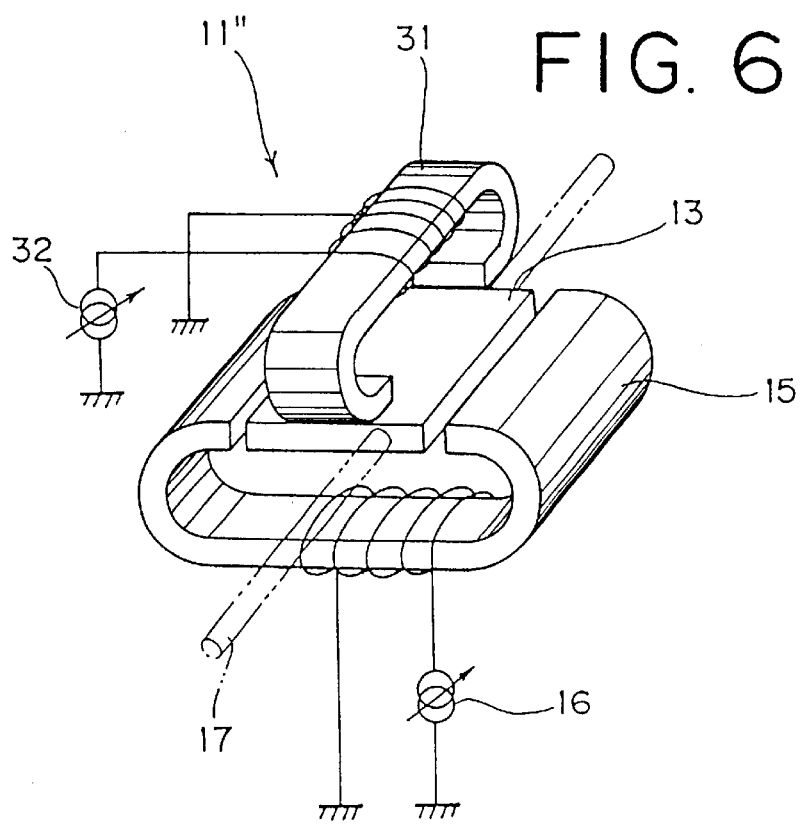
FIG. 6 a perspective view showing a further example of structure of the Faraday rotator shown in FIG. 2.

FIG. 6 is a diagram showing another variation of the Faraday rotator of FIG. 2. Points in which this Faraday rotator 11" are different from the Faraday rotator 11 of FIG. 2 are that an electromagnet 31 is used in place of the permanent magnet 14 in FIG. 2 and further, a variable current source 32 for supplying a drive current to the electromagnet 31 is provided.

Figure 7:
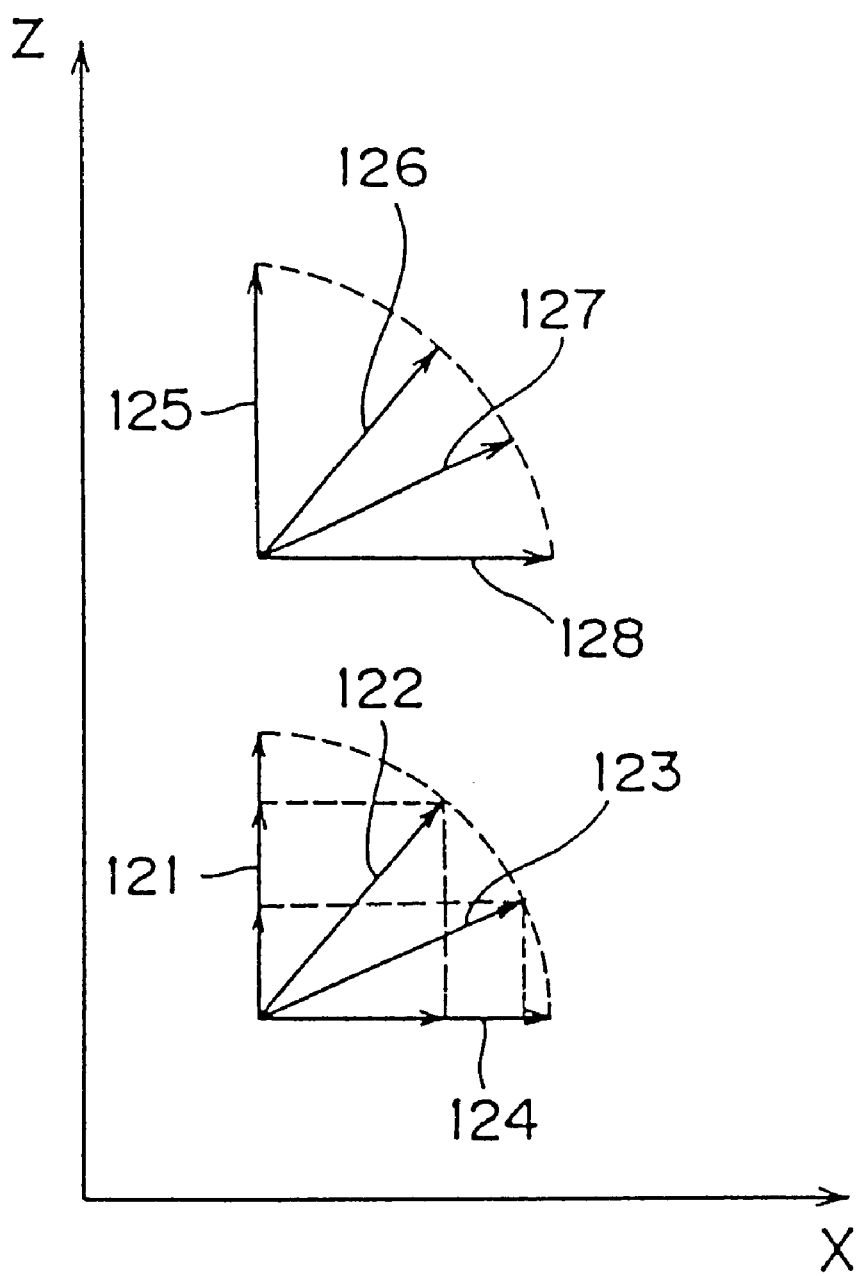
FIG. 7 is a diagram explanatory of magnetic field and magnetization in the Faraday rotator shown in FIG. 6.

FIG. 7 is a diagram explanatory of the magnetic field and magnetization in the Faraday rotator 11" of FIG. 6. According to the arrangement of FIG. 6, the composite magnetic field can be varied continuously and with the magnetic field kept in its saturated state as indicated by reference numerals from 121 to 124. Accordingly, the magnetization of the magneto-optic crystal 13 is varied as indicated by reference numerals from 125 to 128. Thus, according to the arrangement of FIG. 6, the range of variation of the above described angle $\theta$ can easily be set to that between 0 and $\pi/2$ without using a magneto-optic crystal of a complicated form such as shown in FIG. 4.

Figure 8:
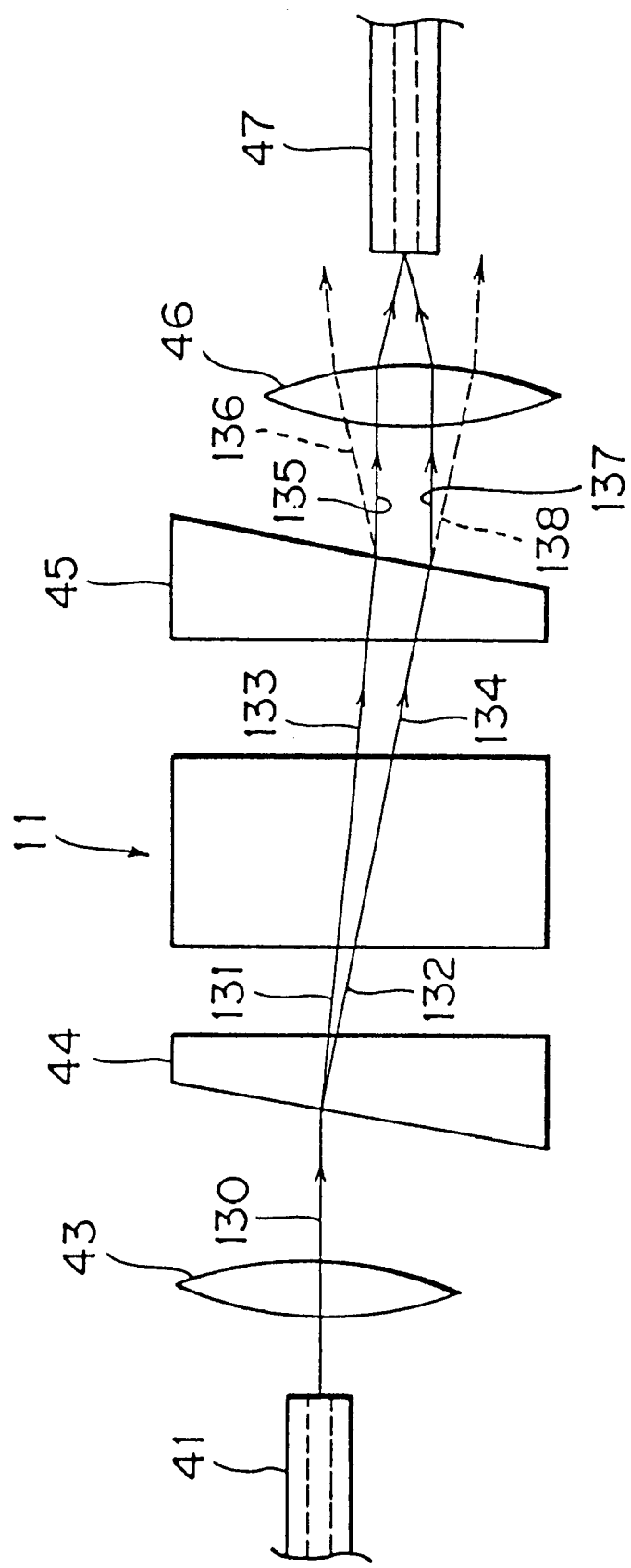
FIG. 8 is a structural drawing of an optical attenuator showing a second embodiment of the present invention.

FIG. 8 is an structural drawing of an optical attenuator showing a second embodiment of the present invention. There are arranged an optical fiber 41, a lens 43, a wedge type double refraction crystal 44, the Faraday rotator 11 of FIG. 2, a wedge type double refraction crystal 45, a lens 46, and an optical fiber 47 from the side of the light source, not shown, in the order named. The material of the double refraction crystals 44 and 45 is for example rutile (TiO$_2$) and they are of the same form. The top and the bottom of the double refraction crystal 44 and the bottom and the top of the double refraction crystal 45 are in opposing positions, respectively, and their corresponding planes are parallel to each other. Further, the optical axes of the double refraction crystals 44 and 45 are on the plane perpendicular to the paper. The relative position of the optical axes depends on the setting of the loss at the time when the input to the variable current source of the Faraday rotator 11 is zero. In the following description, it is supposed that the setting is made such that the loss is reduced to the minimum when the electrical input is zero and the optical axis of the double refraction crystal 44 and the optical axis of the double refraction crystal 45 are parallel to each other.

A light wave emitted from the excitation end of the optical fiber 41 is collimated by the lens 43 to become a parallel light beam. This beam is indicated by reference numeral 130 with its thickness neglected. The beam 130 is separated in the double refraction crystal 44 into a beam 131 corresponding to the ordinary ray and a beam 132 corresponding to the extraordinary ray. The direction of polarization of the beam 131 and the direction of polarization of the beam 132 are perpendicular to each other. The beams 131 and 132 are caused by the Faraday rotator 11 to rotate their directions of polarization the same angle and become beams 133 and 134, respectively. The beam 133 is separated in the double refraction crystal 45 into a beam 135 as its ordinary ray component and a beam 136 as its extraordinary ray component. Also, the beam 134 is separated in the double refraction crystal 45 into a beam 137 as its extraordinary ray component and a beam 138 as its ordinary ray component. When the history of refraction each of the beams 135 to 138 has undergone and the form and arrangement of the double refraction crystals 44 and 45 are taken into consideration, the beams 135 and 137 are parallel to each other and the beams 136 and 138 are not parallel to each other. Accordingly, only the beams 135 and 137 out of the beams 135 to 138 can be converged by the lens 46 to be introduced into the optical fiber 47.

The ratio between the total power of the beams 135 and 137 to the total power of the beams 136 and 138 depends on the angle of Faraday rotation in the Faraday rotator 11. On the other hand, in the state where the angle of Faraday rotation in the Faraday rotator 11 is constant, the total power of the beams 135 and 137 does not depend on the state of polarization of the light wave emitted from the optical fiber 41. Therefore, according to the present embodiment, it is made possible to provide an optical attenuator, of which the attenuation factor can be varied continuously and electrically and the attenuation factor is not dependent on the state of polarization of the input light wave.

Figure 9:
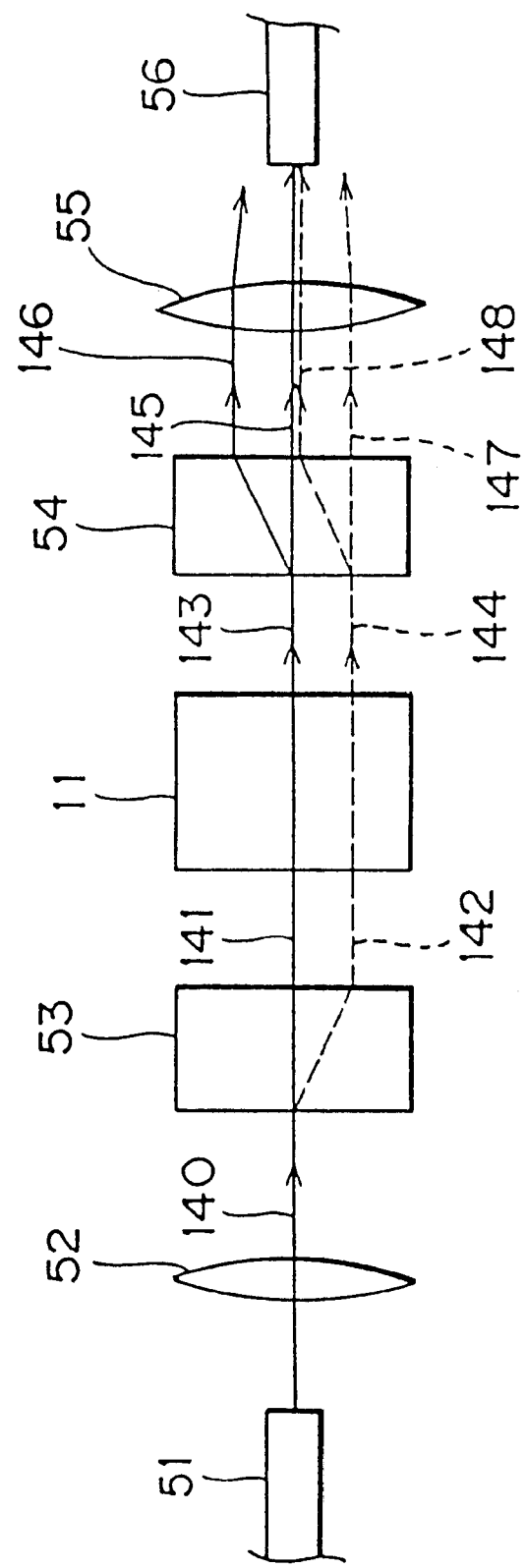
FIG. 9 is a structural drawing of an optical attenuator showing a third embodiment of the present invention.

FIG. 9 is a structural drawing of an optical attenuator showing a third embodiment of the present invention. There are arranged an optical fiber 51, a lens 52, a parallel-faced flat plate double refraction crystal 53, the Faraday rotator 11 of FIG. 2, a parallel-faced flat plate type double refraction crystal 54, a lens 55, and an optical fiber 56 from the side of the light source, not shown, in the order named. The double refraction crystals 53 and 54 are formed for example of rutile and are of equal thickness. The optical axis of the double refraction crystal 53 and the optical axis of the double refraction crystal 54 are perpendicular to each other and each of the optical axes is at an angle of 45° with the direction of propagation of the light beam. A light wave emitted from the excitation end of the optical fiber 51 is collimated by the lens 52 into a parallel beam. The beam is denoted by reference numeral 140 with its thickness neglected. The beam 140 is separated in the double refraction crystal 53 into a beam 141 corresponding to its ordinary ray and a beam 142 corresponding to its extraordinary ray. The beam 141 and the beam 142 are parallel to each other and the direction of polarization of the beam 141 and the direction of polarization of the beam 142 are perpendicular to each other. The beams 141 and 142 are caused by the Faraday rotator 11 to rotate their direction of polarization and become beams 143 and 144, respectively.

The beam 143 is separated in the double refraction crystal 54 into a beam 145 corresponding to its ordinary ray component and a beam 146 corresponding to its extraordinary ray component. The beam 144 is separated in the double refraction crystal 54 into a beam 147 corresponding to its ordinary ray component and a beam 148 corresponding to its extraordinary ray component. Since the double refraction crystals 53 and 54 are parallel to each other and are equal in thickness, the beam 145 coincides with the beam 148. Accordingly, only the beams 145 and 148 out of the beams 145 to 148 can be converged by the lens 55 and introduced into the optical fiber 56.

The ratio between the total power of the beams 145 and 148 to the total power of the beams 146 and 147 depends on the angle of Faraday rotation in the Faraday rotator 11. On the other hand, in the state where the angle of Faraday rotation in the Faraday rotator 11 is constant, the total power of the beams 145 and 148 does not depend on the state of polarization of the light wave emitted from the optical fiber 51. Therefore, according to the present embodiment, it is made possible to provide an optical attenuator of which the attenuation factor can be varied continuously and electrically and the attenuation factor is not dependent on the state of polarization of the input light wave.

Figure 10:
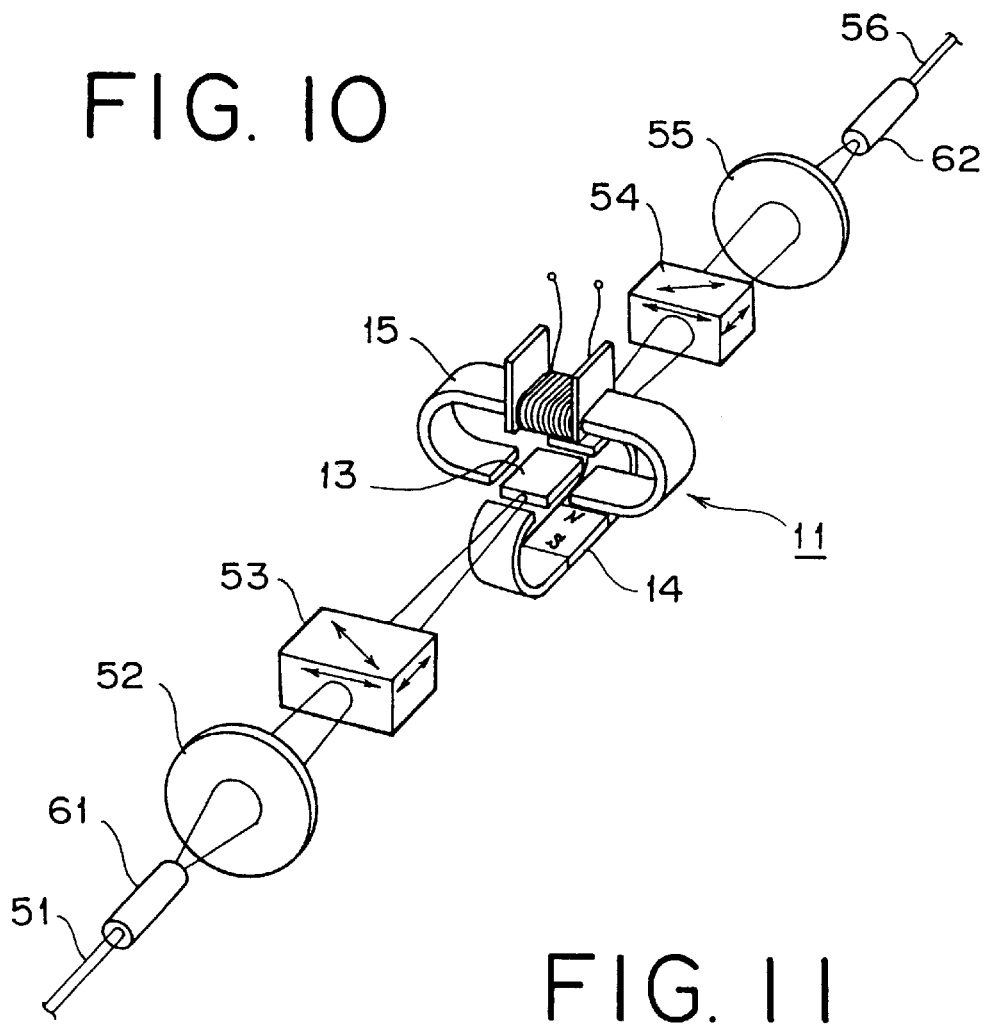
FIG. 10 is a perspective view showing an actually assembled state of the optical attenuator shown in FIG. 9.

FIG. 10 is a perspective view of the optical attenuator of FIG. 9 in an actually assembled state. The end portion of the optical fiber 51 is supported by a ferrule 61 and the end portion of the optical fiber 56 is supported by a ferrule 62. In the description of FIG. 9, to make it easy to trace the light ray, a system of parallel beam is described to be formed between the lens 52 and the lens 55, but in actual assembly of the optical attenuator, it is arranged such that two focal points are formed between the lenses 52 and 55 as shown in FIG. 10. These focal points are located within the magneto-optic crystal 13 of the Faraday rotator 11. The light wave emitted from the excitation end of the optical fiber 51 is converged by the lens 52 so that the beam diameter is reduced to the minimum within the magneto-optic crystal 13. The beam diameter is enlarged again as it advances from the magneto-optic crystal 13 to the lens 55. This beam is converged by the lens 55 and introduced into the optical fiber 56. By structuring such an optical system, the beam diameter within the magneto-optic crystal 13 can be made smaller and, hence, the use of the expensive magneto-optic crystal can be reduced to the minimum. In addition, the permanent magnet 14 and electromagnet 15 for applying necessary magnetic fields to the magneto-optical crystal 13 can be made smaller.

Figure 11:
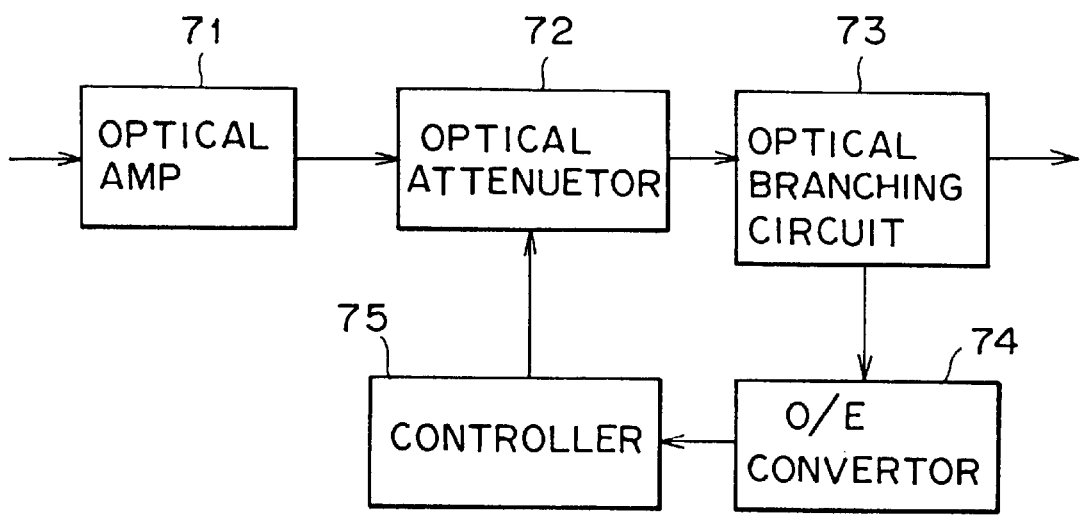
FIG. 11 is a block diagram of an optical repeater to which the optical attenuator according to the present invention is applicable.

FIG. 11 is a block diagram of an optical repeater to which the optical attenuator of the present invention is applicable. An optical signal supplied from an optical transmission line, not shown, is amplified by an optical amplifier 71. The amplified optical signal is passed through the optical attenuator 72 of the present invention and divided into two branches in the optical branching circuit 73. One of the branched light beams is delivered to an optical transmission line, not shown, and the other of the branched light beams is converted to an electric signal in an O/E converter 74. This electric signal is supplied to a controller 75. The controller 75 controls the attenuation factor of the optical attenuator 72 such that the intensity of light received by the O/E converter 74 becomes constant.

Since the optical repeater of the described type is frequently installed at such a place as the bottom of the sea, where maintenance of it is difficult and each component of it is required to be highly reliable, the optical attenuator of the invention having no mechanically moving part is most suitable for use as the component of such an optical repeater. Further, since the responding speed of the optical attenuator of the invention is high, it can sufficiently respond to a quick variation in the intensity level of the optical signal.

The present invention is not limited by the details of the above described preferred embodiments. The scope of the invention is defined by the appended claims and all charges and modifications as fall within the equivalence of the scope of the claims are therefore to be embraced by the invention.

What is claimed is:

1. An apparatus comprising:
   an optical amplifier amplifying a light; and
   an optical attenuator variably attenuating the amplified light without mechanically moving along an optical path of the amplified light, wherein the apparatus is a repeater.
2. An apparatus as in claim 1, wherein the optical attenuator comprises a controller controlling the attenuation of the optical attenuator.
3. An apparatus as in claim 2, wherein the controller controls the attenuation by varying an output of the optical attenuator.
4. An apparatus as in claim 1, wherein the optical attenuator attenuates the amplified light at an output of the optical amplifier.
5. An apparatus as in claim 1, wherein the optical attenuator is controlled in accordance with an output level of the optical attenuator.
6. An apparatus comprising:
   an optical amplifier amplifying a light; and
   an optical attenuator including a polarizing part and a polarization rotating part which operate together to variably attenuate the amplified light, wherein the apparatus is a repeater.
7. An apparatus as in claim 6, wherein the optical attenuator includes a controller controlling the attenuation of the optical attenuator.
8. An apparatus as in claim 7, wherein the controller controls the attenuation by varying an output of the optical attenuator.
9. An apparatus as in claim 6, wherein the optical attenuator attenuates the amplified light at an output of the optical amplifier.
10. An apparatus as in claim 6, wherein the optical attenuator is controlled in accordance with an output level of the optical attenuator.
11. A method comprising:
    optically amplifying a light by a repeater; and
    variably attenuating the amplified light by the repeater without mechanically moving along an optical path of the amplified light.
12. A method as in claim 11, further comprising:
    controlling the level of attenuation.
13. A method as in claim 11, further comprising:
    controlling the attenuation in accordance with an output level of the amplified and attenuated light.
14. A method comprising:
    optically amplifying a light by a repeater;
    polarizing the amplified light by the repeater; and
    rotating the polarization of the amplified light by the repeater, said polarizing and said rotating operating together to variably attenuate the amplified light by the repeater.
15. A method as in claim 14, further comprising:
    controlling the level of attenuation.
16. A method as in claim 14, further comprising:
    controlling the rotation in accordance with an output level of the amplified and attenuated light.
17. An optical communication system comprising:
    a transmitter transmitting a light;
    a repeater including
      an amplifier optically amplifying the transmitted light, and
      an optical attenuator variably attenuating the amplified light without mechanically moving along an optical path of the amplified light, and outputting the attenuated light; and
    a receiver receiving the attenuated light.
18. A method comprising:
    transmitting a light;
    optically amplifying the transmitted light by a repeater;
    variably attenuating the amplified light by the repeater without mechanically moving along an optical path of the amplified light; and
    receiving the attenuated light.
19. An apparatus comprising:
    an optical amplifier amplifying a light; and
    an optical attenuator variably attenuating the amplified light at an output of the optical amplifier without mechanically moving along an optical path of the amplified light.
20. An apparatus as in claim 19, wherein the optical attenuator comprises a controller controlling the attenuation of the optical attenuator.
21. An apparatus as in claim 20, wherein the controller controls the attenuation by varying an output of the optical attenuator.
22. An apparatus as in claim 19, wherein the optical attenuator is controlled in accordance with an output level of the optical attenuator.
23. An apparatus comprising:
    an optical amplifier amplifying a light; and
    an optical attenuator including a polarizing part and a polarization rotating part which operate together to variably attenuate the amplified light at an output of the optical amplifier.
24. An apparatus as in claim 23, wherein the optical attenuator is controlled in accordance with an output level of the optical attenuator.
25. An apparatus as in claim 23, wherein the optical attenuator includes a controller controlling the attenuation of the optical attenuator.
26. An apparatus as in claim 25, wherein the controller controls the attenuation by varying an output of the optical attenuator.

27. A method comprising:

optically amplifying a light with an optical amplifier; and variably attenuating the amplified light at an output of the optical amplifier without mechanically moving along an optical path of the amplified light.

28. A method as in claim 27, further comprising:

controlling the level of attenuation.

29. A method as in claim 27, further comprising:

controlling the attenuation in accordance with an output level of the amplified and attenuated light.

30. A method comprising:

optically amplifying a light with an optical amplifier;

polarizing the amplified light; and rotating the polarization of the amplified light, said polarizing and said rotating operating together to variably attenuate the amplified light at an output of the optical amplifier.

31. A method as in claim 30, further comprising:

controlling the level of attenuation.

32. A method as in claim 30, further comprising:

controlling the rotation in accordance with an output level of the amplified and attenuated light.

33. An optical communication system comprising:

a transmitter transmitting a light;

an amplifier optically amplifying the transmitted light;

an optical attenuator variably attenuating the amplified light at an output of the amplifier without mechanically moving along an optical path of the amplified light, and outputting the attenuated light; and a receiver receiving the attenuated light.

34. A method comprising:

transmitting a light;

optically amplifying the transmitted light with an optical amplifier; and variably attenuating the amplified light at an output of the optical amplifier without mechanically moving along an optical path of the amplified light.

35. An apparatus as in claim 1, wherein the optical attenuator includes a polarizing part and a polarization rotating part which operate together to variably attenuate the amplified light.

36. An apparatus as in claim 1, wherein the optical attenuator rotates a polarization of the amplified light.

37. A method as in claim 11, wherein the variably attenuating includes polarizing the amplified light; and rotating the polarization of the amplified light.

38. An method as in claim 11, wherein the variably attenuating includes rotating the polarization of the amplified light.

39. An apparatus as in claim 17, wherein the optical attenuator includes a polarizing part and a polarization rotating part which operate together to variably attenuate the amplified light.

40. An apparatus as in claim 17, wherein the optical attenuator rotates a polarization of the amplified light.

41. A method as in claim 18, wherein the variably attenuating includes polarizing the amplified light; and rotating the polarization of the amplified light.

42. A method as in claim 18, wherein the variably attenuating includes rotating the polarization of the amplified light.

43. An apparatus as in claim 19, wherein the optical attenuator includes a polarizing part and a polarization rotating part which operate together to variably attenuate the amplified light.

44. An apparatus as in claim 19, wherein the optical attenuator rotates a polarization of the amplified light.

45. A method as in claim 27, wherein the variably attenuating includes polarizing the amplified light; and rotating the polarization of the amplified light.

46. A method as in claim 27, wherein the variably attenuating includes rotating the polarization of the amplified light.

47. An apparatus as in claim 33, wherein the optical attenuator includes a polarizing part and a polarization rotating part which operate together to variably attenuate the amplified light.

48. An apparatus as in claim 33, wherein the optical attenuator rotates a polarization of the amplified light.

49. A method as in claim 34, wherein the variably attenuating includes polarizing the amplified light; and rotating the polarization of the amplified light.

50. A method as in claim 34, wherein the variably attenuating includes rotating the polarization of the amplified light.

* * * * *